US010120157B2

(12) United States Patent
Kitamura et al.

(10) Patent No.: US 10,120,157 B2
(45) Date of Patent: Nov. 6, 2018

(54) LENS UNIT

(71) Applicant: Konica Minolta, Inc., Tokyo (JP)

(72) Inventors: Hiroki Kitamura, Osaka (JP); Atsushi Matsuura, Hyogo (JP); Keisuke Kuryo, Osaka (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/541,218

(22) PCT Filed: Jan. 6, 2016

(86) PCT No.: PCT/JP2016/050215
§ 371 (c)(1),
(2) Date: Jun. 30, 2017

(87) PCT Pub. No.: WO2016/114187
PCT Pub. Date: Jul. 21, 2016

(65) Prior Publication Data
US 2017/0363834 A1    Dec. 21, 2017

(30) Foreign Application Priority Data

Jan. 14, 2015  (JP) .................................. 2015-005251

(51) Int. Cl.
*G02B 7/02* (2006.01)
*G03B 17/12* (2006.01)
*G03B 21/14* (2006.01)
*G03B 21/53* (2006.01)

(52) U.S. Cl.
CPC .............. *G02B 7/028* (2013.01); *G02B 7/02* (2013.01); *G02B 7/023* (2013.01); *G03B 17/12* (2013.01); *G03B 21/147* (2013.01); *G03B 21/53* (2013.01)

(58) Field of Classification Search
CPC ...... G02B 6/0218; G02B 7/028; G02B 7/026; G02B 7/008; G02B 7/023; G02B 7/00; G03B 21/53
USPC .................................. 359/676–706, 822–826
See application file for complete search history.

(56) References Cited

FOREIGN PATENT DOCUMENTS

| JP | S61-060406 B2 | 12/1986 |
| JP | H11-337798 A | 12/1999 |

OTHER PUBLICATIONS

International Search Report issued in corresponding application No. PCT/JP2016/050215 dated Apr. 5, 2016 (4 pages).
Written Opinion of the International Searching Authority issued in corresponding application No. PCT/JP2016/050215 dated Apr. 5, 2016 (3 pages).

*Primary Examiner* — Mahidere Sahle
(74) *Attorney, Agent, or Firm* — Osha Liang LLP

(57) ABSTRACT

A lens unit includes a correction lens that corrects movement of a focus position of an optical system, a holding frame that holds the lens, a stationary tube that movably supports the frame along a direction of an optical axis, a movement guide portion that is provided between the tube and the frame in a radial direction of the tube and limits rotation of the frame in a direction intersecting with a plane orthogonal to the optical axis and guides movement of the frame in the direction of the optical axis, bimetals that are provided between the tube and the frame in the direction of the optical axis and change a distance between the frame and the tube along the direction of the optical axis, and a first biasing means that relatively biases the frame against the tube via the movement guide portion in the radial direction of the tube.

20 Claims, 9 Drawing Sheets

LENS UNIT

TECHNICAL FIELD

One or more embodiments of the present invention relate to a lens unit that is used, for example, in a projector or a camera.

BACKGROUND

In an optical system that is composed of a plurality of lenses and provided, for example, in a projector or a camera, the refractive index of the lenses may change or a lens barrel that holds the lenses may expand and contract due to changes in the surrounding ambient temperature. This changes the focus position of the optical system, degrading its optical performance.

Patent Literatures 1 and 2 are examples of references that disclose a lens holding device and a lens unit that correct the focus position using a temperature correction member that deforms with temperature changes to inhibit such degradation of optical performance.

The lens holding device disclosed in Patent Literature 1 uses bimetals as the temperature correction member and is configured to directly support the lenses with the bimetals. Due to deformation of the bimetals with temperature changes, the lenses are moved in a direction of an optical axis to thereby correct the focus position.

The lens unit disclosed in Patent Literature 2 is configured to move a holding frame, which holds a correction lens for correcting the focus position, in the direction of the optical axis by the temperature correction member. Various materials such as resins or alloys may be used for the temperature correction member. Among such materials, bimetals deform greatly relative to temperature changes and are thus capable of achieving a large amount of movement in a small space compared to when other materials are used.

CITATION LIST

Patent Literature

Patent Literature 1: JP 61-60406 B2
Patent Literature 2: JP 11-337798 A

However, in the case in which bimetals are used as the temperature correction member in Patent Literatures 1 and 2, the bimetals are arranged spaced apart from each other in a circumferential direction of the optical axis. Additionally, in the case in which the holding frame is to be moved, a gap is formed due to an engagement backlash between a stationary tube, which fixes the holding frame by engagement, and the holding frame so that the holding frame is permitted to tilt relative to the optical axis because of the gap.

Thus, during changes in the ambient temperature, individual differences and temperature irregularities in the bimetals may cause variations in the amount of deformation of each bimetal which may then cause the lenses themselves to tilt or the holding frame to tilt. This results in degradation of the optical performance.

Designing the holding frame so as to eliminate the engagement backlash between the holding frame and the stationary tube that holds the other lenses requires precise processing. This increases processing costs or causes biting in the case in which materials having different coefficients of thermal expansion are used for the stationary tube and the holding frame.

SUMMARY

One or more embodiments of the present invention provide a lens unit that is capable of correcting variations in focal length caused by changes in ambient temperature while suppressing tilt relative to a plane perpendicular to an optical axis.

A lens unit according to one or more embodiments of the present invention is a lens unit that includes an optical system having a plurality of lenses. The lens unit includes a correction lens that forms a part of the plurality of lenses, has an optical axis, and is configured to correct movement of a focus position of the optical system caused by a temperature change by being moved in a direction of the optical axis, a holding frame that holds the correction lens, a stationary tube that movably supports the holding frame along the direction of the optical axis, a movement guide portion that is provided between the stationary tube and the holding frame in a radial direction of the stationary tube and configured to limit rotation of the holding frame in a direction intersecting with a plane orthogonal to the optical axis and to guide movement of the holding frame in the direction of the optical axis by being in contact with at least one of the stationary tube and the holding frame, a plurality of bimetals that are provided between the stationary tube and the holding frame in the direction of the optical axis, arranged in a circumferential direction of the stationary tube, and configured to change a distance between the holding frame and the stationary tube along the direction of the optical axis by deformation associated with the temperature change, and a first biasing means that is configured to relatively bias the holding frame against the stationary tube via the movement guide portion in the radial direction of the stationary tube.

Advantageous Effects

According to one or more embodiments of the present invention, the lens unit that is capable of correcting variations in focal length caused by changes in ambient temperature while suppressing tilt relative to the plane perpendicular to the optical axis can be provided.

DESCRIPTION OF EMBODIMENTS

Figure 1:
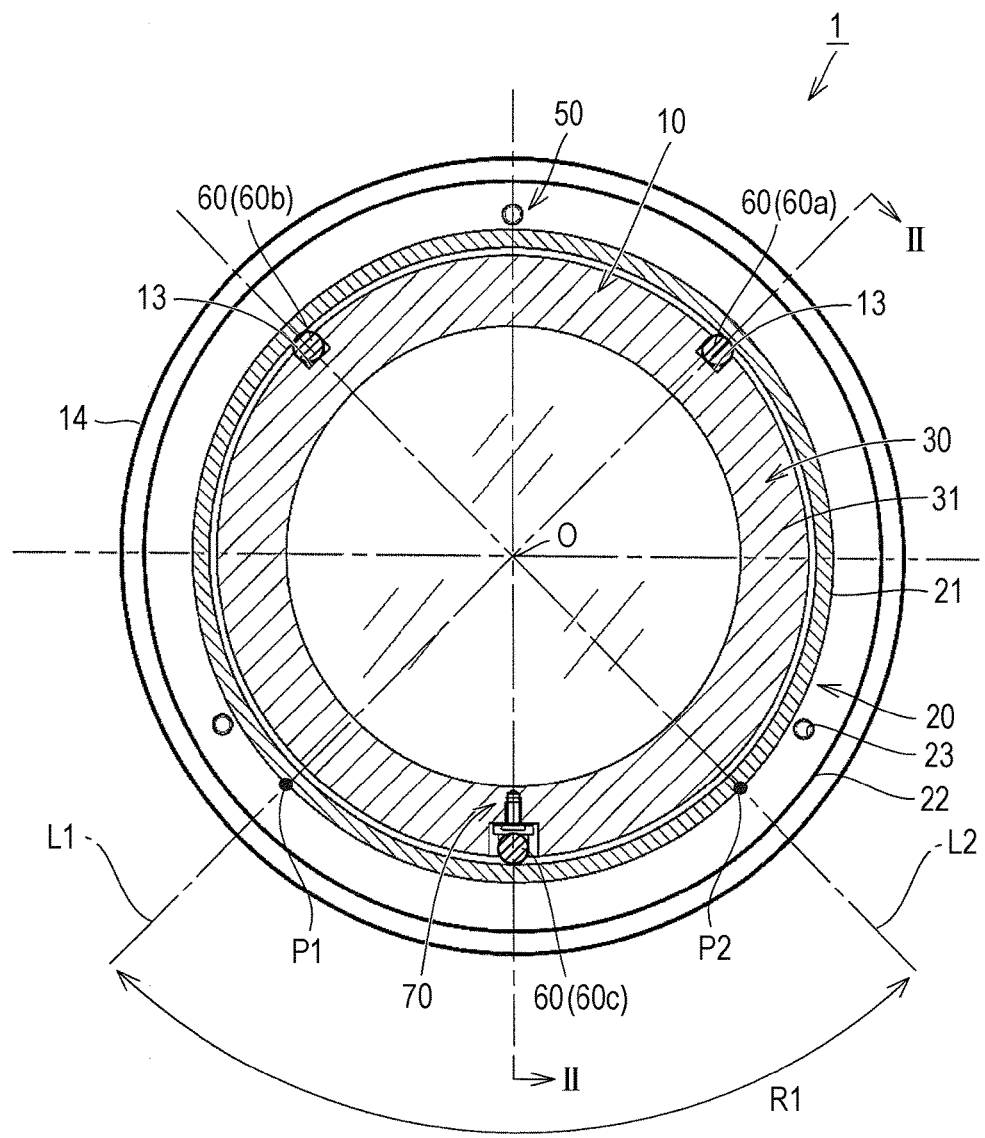
FIG. 1 is a top view of a lens unit according to a first embodiment.

Embodiments of the present invention will be described in detail below with reference to the drawings. Same or common parts of the embodiments shown below are designated with the same numerals in the drawings, and description thereof will not be repeated.

First Embodiment

Figure 2:
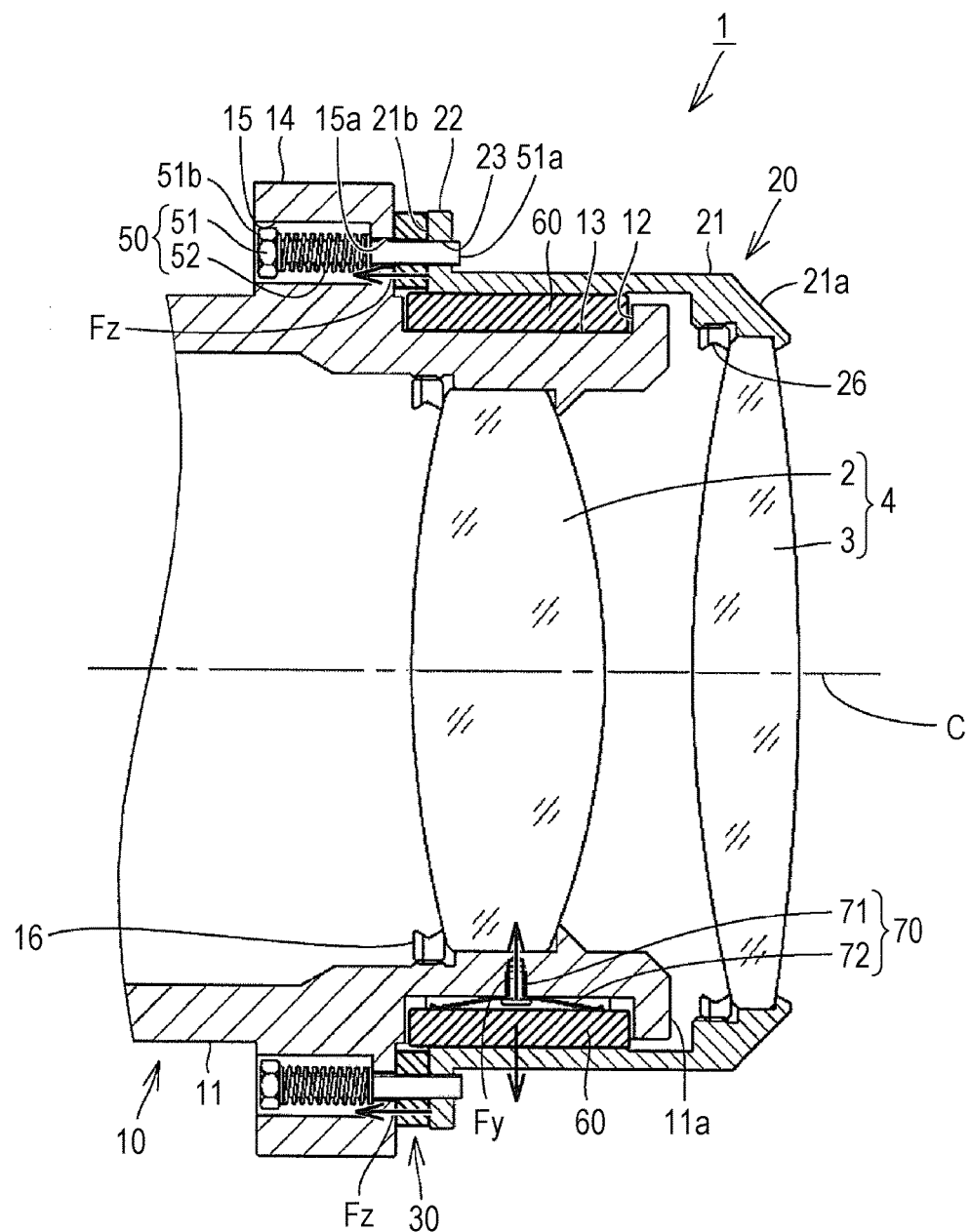
FIG. 2 is a schematic cross-sectional view taken along the line II-II of FIG. 1.

FIG. 1 is a top view of a lens unit according to this embodiment. FIG. 2 is a schematic cross-sectional view taken along the line II-II of FIG. 1. A lens unit 1 according to this embodiment will be described with reference to FIGS. 1 and 2.

As shown in FIGS. 1 and 2, the lens unit 1 according to this embodiment includes an optical system 4 that is composed of a plurality of lenses, a stationary tube 10, a holding frame 20, a focal length correction means 30, a movement guide portion 60, a first biasing means 70, and a second biasing means 50.

The optical system 4 has an optical axis C and is configured so that the plurality of lenses is arranged along a direction of the optical axis C. The optical system 4 includes a correction lens 3 and at least one or more lenses 2. The correction lens 3 corrects movement of a focus position of the optical system 4 that is caused by a temperature change. The correction lens 3 is positioned nearer toward an image than the lens 2. The correction lens 3 constitutes apart of the plurality of lenses, which is included in the optical system 4.

The stationary tube 10 movably supports the holding frame 20 along the direction of the optical axis C. The stationary tube 10 has a tubular shape. The stationary tube 10 includes a tubular portion 11, a recess 12, a flange portion 14, a receptacle 15, and a lens holding portion 16.

The holding frame 20 is mounted from a side of a distal end 11a of the tubular portion 11. The recess 12 is provided on an outer peripheral surface of the tubular portion 11. The recess 12 is formed by the outer peripheral surface of the tubular portion 11 being recessed radially inward. The recess 12 is provided between the distal end 11a of the tubular portion 11 and the flange portion 14. A bottom 13 of the recess 12 is provided so as to be a plane that is parallel to the optical axis C. The bottom 13 of the recess 12 corresponds to a movement reference surface.

The flange portion 14 is provided so as to protrude radially outward from the outer peripheral surface of the tubular portion 11 in a transition region of the tubular portion 11. Provided within the flange portion 14 is the receptacle 15 that receives a screw 51 of the second biasing means 50 described below.

For example, three of the receptacles 15 are provided. The three receptacles 15 are provided circumferentially spaced apart from each other. The receptacle 15 is formed by a part of one end (rear end) side of the flange portion 14 where the holding frame 20 is located being caved in toward the other end (distal end) side. The receptacle 15 is provided at a substantially central part thereof with a hole 15a through which a shaft of the screw 51 described below can be inserted.

The holding frame 20 holds the correction lens 3. The holding frame 20 is assembled to the stationary tube 10 so as to be movable along the direction of the optical axis C. That is, the holding frame 20 is assembled to the stationary tube 10 to be movable parallel to the bottom 13, which is the movement reference surface, of the recess 12.

The holding frame 20 includes a tubular portion 21 and a collar portion 22. The tubular portion 21 is provided toward a distal end 21a with a lens holding portion 26, and the correction lens 3 is held by the lens holding portion 26. The collar portion 22 is provided on a rear end side of the tubular portion 21. The collar portion 22 is provided so as to protrude radially outward from an outer peripheral surface of the tubular portion 21.

The collar portion 22 has a through hole 23 that passes therethrough in a direction parallel to the direction of the optical axis C. A distal end 51a of the screw 51 described below that constitutes the second biasing means 50 is inserted through the through hole 23. For example, three of the through holes 23 are provided. The three through holes 23 are provided circumferentially spaced from each other.

The focal length correction means 30 has an annular shape. The focal length correction means 30 is for moving the holding frame 20 along the direction of the optical axis C. The focal length correction means 30 is provided between the stationary tube 10 and the holding frame 20 along the direction of the optical axis C. Specifically, the focal length correction means 30 is provided so as to be sandwiched between the flange portion 14 of the stationary tube 10 and the collar portion 22 of the holding frame 20. Details of the focal length correction means 30 will be described below using FIGS. 3 and 4.

The second biasing means 50 biases the holding frame 20 against the stationary tube 10 via bimetals 32 (see FIG. 3) in the direction of the optical axis C. A plurality of the second biasing means 50 may be provided. For example, three of the second biasing means 50 are provided. The three second biasing means 50 is arranged circumferentially spaced from each other.

Each second biasing means 50 includes the screw 51 and an elastic member 52. The screw 51 is fixed to the holding frame 20 by threads provided on a distal end portion of the screw 51 threadedly engaging the through hole 23 of the collar portion 22 of the holding frame 20.

The elastic member 52 expands and contracts along the direction of the optical axis C. The elastic member 52 biases the holding frame 20 against the stationary tube 10 via the focal length correction means 30 by exerting an elastic force. For example, when the holding frame 20 moves away along the direction of the optical axis C due to deformation of the bimetals 32 of the focal length correction means 30 described below caused by a temperature change, the elastic member 52 is compressed so that the elastic force of the elastic member 52 is exerted to act against the direction of movement of the holding frame 20.

This elastic force acts on the holding frame 20, which is fixed to the distal end 51a of the screw 51, from a head 51b of the screw 51 via the shaft of the screw 51. The holding frame 20 thus is pulled toward the focal length correction means 30, and as a result, the holding frame 20 is biased against the stationary tube 10 via the focal length correction means 30.

In the case in which the plurality of the second biasing means 50 is provided, a position of the holding frame 20 relative to the stationary tube 10 in the direction of the optical axis C is adjusted by a biasing force generated by each of the second biasing means 50. In addition, adjusting the biasing force of each second biasing means 50 during assembly reduces tilt of the holding frame 20 caused by variations in height of the bimetals 32 along the optical axis C.

The movement guide portion 60 is provided between the stationary tube 10 and the holding frame 20 in a radial direction of the stationary tube 10. The movement guide portion 60 has a cylindrical shape. The movement guide portion 60 is provided separate from the stationary tube 10.

The movement guide portion 60 is received in the recess 12 such that a part thereof protrudes from the recess 12 radially outward of the stationary tube 10. The movement guide portion 60 is in contact with an inner peripheral surface of the holding frame 20. More specifically, the movement guide portion 60 is in line contact with the inner peripheral surface of the holding frame 20 in the direction parallel to the optical axis C. The movement guide portion 60 guides the movement of the holding frame 20 in the direction of the optical axis C by being in line contact with the holding frame 20. In addition, with the movement guide portion 60 being in line contact with the holding frame 20, rotation of the holding frame 20 in a direction intersecting with a plane orthogonal to the optical axis C is limited even if a force is applied in a direction that connects the movement guide portion 60 to a center O of the stationary tube 10.

A plurality of the movement guide portions 60 is provided such that they are arranged spaced from each other in a circumferential direction of the stationary tube 10 when viewed from the direction of the optical axis. For example, three of the movement guide portions 60 are provided. The three movement guide portions 60 are provided so as to be arranged alternately with the three second biasing means 50 in the circumferential direction.

By providing three or more of the movement guide portions 60 spaced from each other in the circumferential direction, the movement of the holding frame 20 in the direction of the optical axis is further stabilized and the rotation of the holding frame 20 in the direction intersecting with the plane orthogonal to the optical axis C is further suppressed.

At least one of movement guide portions 60c of the other movement guide portions 60 other than a first movement guide portion 60a and a second movement guide portion 60b may be provided in a region R1 between a first intersection point P1 and a second intersection point P2 which are on a side in the circumferential direction of the stationary tube 10 where the first movement guide portion 60a and the second movement guide portion 60b are not located, where the first movement guide portion 60a and the second movement guide portion 60b are two of the movement guide portions 60 adjacent to each other in the circumferential direction of the stationary tube 10 of the plurality of the movement guide portions 60, a first imaginary line L1 is a line connecting the first movement guide portion 60a to the center O of the stationary tube 10 and a second imaginary line L2 is a line connecting the second movement guide portion 60b to the center O of the stationary tube 10 when viewed from the direction of the optical axis C, the first intersection point P1 is located opposite the first movement guide portion 60a when viewed from the center O and is an intersection point between the first imaginary line L1 and the outer peripheral surface of the stationary tube 10, and the second intersection point P2 is located opposite the second movement guide portion 60b when viewed from the center O and is an intersection point between the second imaginary line L2 and the outer peripheral surface of the stationary tube 10.

The first biasing means 70 relatively biases the holding frame 20 against the stationary tube 10 via the movement guide portion 60 in the radial direction of the stationary tube 10. The first biasing means 70 includes a fixing portion 71 and an elastic member 72. The fixing portion 71 fixes the elastic member 72 to the stationary tube 10. The fixing portion 71 is composed, for example, of a screw.

The elastic member 72 is provided between the stationary tube 10 and the holding frame 20 in the radial direction of the stationary tube 10. A leaf spring can be used for the elastic member 72. The elastic member 72 presses the movement guide portion 60 against the inner peripheral surface of the holding frame 20.

Thus, even when the stationary tube 10 and the holding frame 20 are engaged with each other such that a slight gap is formed therebetween, the movement guide portions 60 and the holding frame 20 are reliably brought into contact. As a result, the holding frame 20 is moved along the direction of the optical axis C while suppressing tilt relative to a plane perpendicular to the optical axis so that variations in focal length caused by changes in ambient temperature are corrected.

Figure 3:
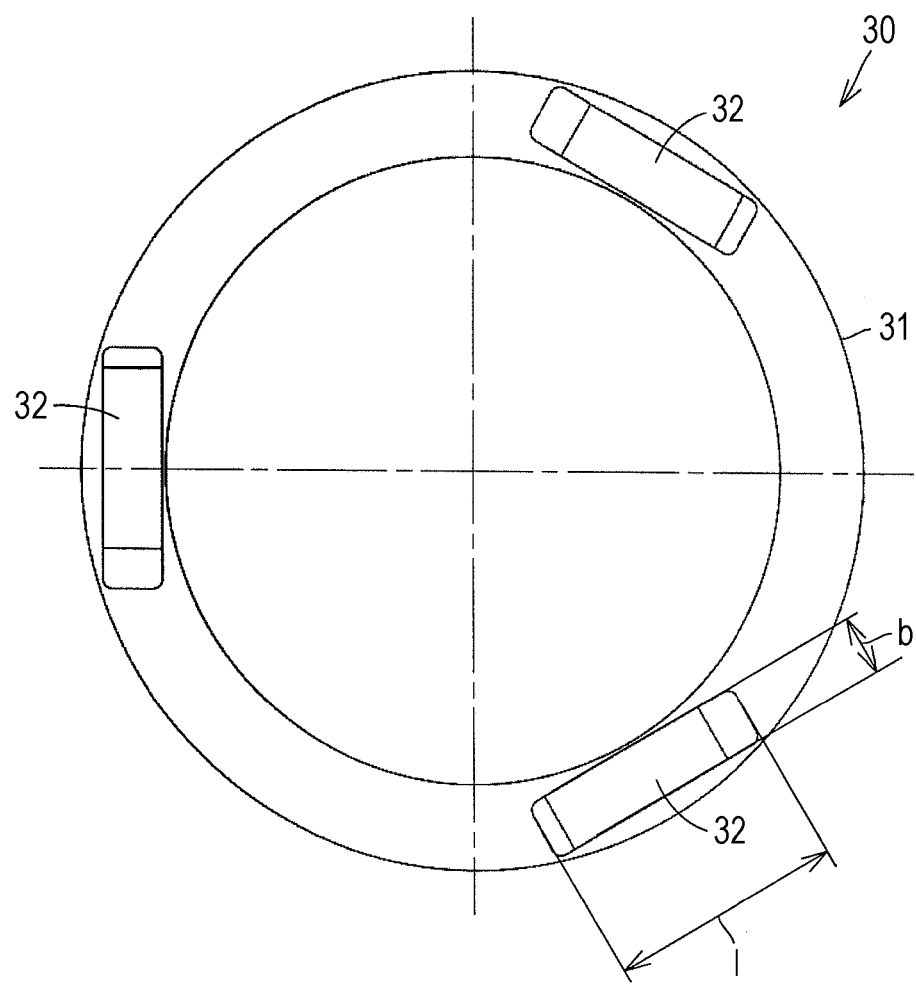
FIG. 3 is a top view of a focal length correction means shown in FIG. 1.
Figure 4:
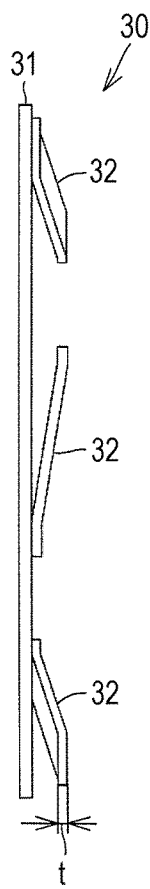
FIG. 4 is a side view of the focal length correction means shown in FIG. 1.

FIG. 3 is a top view of the focal length correction means shown in FIG. 1. FIG. 4 is a side view of the focal length correction means shown in FIG. 1. A configuration of the focal length correction means 30 will be described with reference to FIGS. 3 and 4.

As shown in FIGS. 3 and 4, the focal length correction means 30 includes an annular base plate 31 and the bimetals 32 as heat deformed members. The annular base plate 31 has an inner diameter that is slightly larger than an outer diameter of the tubular portion 11. Thus, the base plate 31 fits onto the tubular portion 11 and is placed on the flange portion 14.

Each bimetal 32 is plate-shaped and has a lateral direction and a longitudinal direction. For example, three of the bimetals 32 are provided. The three bimetals 32 are arranged spaced from each other in the circumferential direction of the stationary tube 10.

The bimetals 32 are two metal plates with different coefficients of thermal expansion stuck together and change their shapes with temperature changes. Each bimetal 32 is fixed to the base plate 31 at one end with the other end of each bimetal 32 being a free end.

In this embodiment, b is a width dimension of the lateral direction of the bimetal 32, l is a length dimension of the longitudinal direction of the bimetal 32, and t is a plate thickness (thickness dimension) of the bimetal 32. These dimensions of the bimetals 32 are parameters that define a force that acts on the stationary tube 10 and the bimetals 32.

Referring again to FIG. 2, as the force that acts on the stationary tube 10, there is a force $F_y$ that acts in the radial direction thereof. As the force that acts on the bimetals 32, there is a force $F_z$ which acts in the direction of the optical axis C and which is a force based on the biasing force of each second biasing means 50 that acts so as to bring the holding frame 20 into contact with the bimetals 32.

If the radial force $F_y$ that acts on the stationary tube 10 is too large, the holding frame 20 will not move along the direction of the optical axis C. If the radial force $F_y$ that acts on the stationary tube 10 is too small, the holding frame 20 will be prone to tilting upon substantial impact on a camera, a projector, or the like in which the lens unit 1 is mounted. Thus, the radial force $F_y$ that acts on the stationary tube 10 may be larger than a lower limit value and smaller than an upper limit value described below.

Since the movement of the holding frame 20 is caused by the deformation of the bimetals 32 associated with changes in ambient temperature, the upper limit of $F_y$ is determined by $\Delta T_a$, where $\Delta T_a$ is the temperature change. The lower limit of $F_y$ is calculated so as to suppress the tilt of the holding frame 20 and is thus determined by a tilt $\Delta d_a$ permitted to the holding frame 20.

In this embodiment, the biasing forces of the first biasing means 70 and the second biasing means 50 are adjusted such that the force $F_y$ that acts on the stationary tube 10 satisfies Formula (1) below, where $F_y$ is the radial force that acts on the stationary tube 10, f (d) is a function of the tilt d relative to the plane perpendicular to the optical axis C that is permitted to the holding frame 20, mg is a weight of a moving portion that includes the holding frame 20 and the correction lens 3, $\Delta T_a$ is the temperature change required for the holding frame 20 to start moving, E is an elastic modulus of the bimetal 32, b is the width of the bimetal 32 in the lateral direction, t is the thickness of the bimetal 32, l is the length of the bimetal 32 in the longitudinal direction, K is a curvature coefficient of the bimetal 32, and μ is a friction coefficient during movement of the holding frame 20 in the direction of the optical axis

[Mathematical Formula 1]

$$mgf(d) < F_y < \frac{Ebt^2 K}{8\mu l}\Delta T_a \qquad \text{Formula (1)}$$

When adjusted as above, the tilt of the holding frame 20 can be suppressed even when the lens unit 1 illustrated in FIGS. 1 and 2 is turned upside down, that is, when the orientation of the lens unit 1 is changed from a state in which the own weight of the stationary tube 10 is applied to the first biasing means 70 to a state in which the own weight of the holding frame 20 is applied to the first biasing means 70, reducing a force for pressing the holding frame 20 against the movement guide portion 60.

Figure 5:
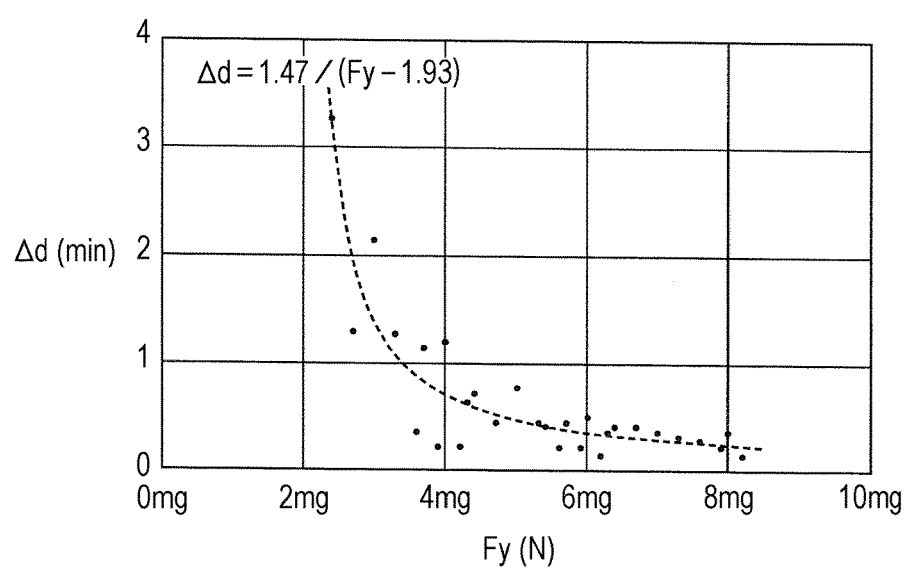
FIG. 5 is a graph showing a relationship between a radial force Fy that acts on a stationary tube and a tilt d of a holding frame relative to a plane perpendicular to an optical axis.

FIG. 5 is a graph showing a relationship between the radial force $F_y$ that acts on the stationary tube 10 and the tilt d of the holding frame 20 relative to the plane perpendicular to the optical axis C. An example of the function f(d) of the tilt d of the holding frame 20 relative to the plane perpendicular to the optical axis C, which defines the lower limit of the radial force $F_y$ that acts on the stationary tube 10, will be described with reference to FIG. 5. It should be noted that FIG. 5 plots the tilt d of the holding frame 20 with the radial force $F_y$ that acts on the stationary tube 10 being changed for each measurement.

As shown in FIG. 5, as the radial force $F_y$ that acts on the stationary tube 10 becomes smaller, the tilt d of the holding frame 20 relative to the plane perpendicular to the optical axis C tends to become greater. As shown by the dashed line in FIG. 5, the example of the function f(d) of the tilt d of the holding frame 20 relative to the plane perpendicular to the optical axis C calculated from a plurality of the plots mentioned above is represented by Formula (1a) below.

[Mathematical Formula 2]

$$f(d) = \left(\frac{1.47}{\Delta d} + 1.93\right) \qquad \text{Formula (1a)}$$

In the function f(d) shown in Formula (1a), when, for example, the tilt d relative to the plane perpendicular to the optical axis C permitted to the holding frame 20 is to be 1.0, d=1.0 is substituted into Formula (1a) so that f(1)=3.4.

Based on this result and Formula (1) above, the tilt of the holding frame 20 upon impact can be suppressed by determining the biasing forces of the first biasing means 70 and the second biasing means 50 such that a force 3.4 times the weight mg of the moving portion (the holding frame 20 and the correction lens 3) acts in the radial direction of the stationary tube 10.

The movement of the holding frame 20 in the direction of the optical axis C is also influenced by the force $F_z$ that acts on the bimetals 32 in the direction of the optical axis C. Thus, adjusting the force $F_z$ that acts on the bimetals 32 in the direction of the optical axis C enables the holding frame 20 to move in the direction of the optical axis C without tilting.

If the force $F_z$ that acts on the bimetals 32 in the direction of the optical axis C is too large, the deformation of the bimetals 32 will not be able to be tolerated. If the force $F_z$ that acts on the bimetals 32 in the direction of the optical axis C is too small, the holding frame 20 will not be able to be sufficiently pressed against the bimetals 32 when the bimetals 32 deform such that the holding frame 20 moves toward the stationary tube 10 along the direction of the optical axis C. This will cause the holding frame 20 to tilt. Thus, the force $F_z$ that acts on the bimetals 32 in the direction of the optical axis C may be at or larger than a minimum value described below and smaller than an upper limit value.

In this embodiment, the biasing forces of the first biasing means 70 and the second biasing means 50 are adjusted such that Formula (2) below is satisfied, where $F_z$ is the force that acts on the bimetals 32 in the direction of the optical axis C, k is a spring constant of the elastic member 52, $F_{zmin}$ is the minimum force (minimum value) that acts on the bimetals 32 in the direction of the optical axis C and is required for all of the plurality of the bimetals 32 to come into contact with the holding frame 20 within an operating temperature range, and $\sigma_a$ is an allowable stress of the bimetals 32.

[Mathematical Formula 3]

$$F_{zmin} \leq F_z < \frac{bt^2 \sigma_a}{6l} \qquad \text{Formula (2)}$$

$F_{zmin}$ is defined by the elastic modulus E of the bimetal 32, the width b of the bimetal 32, the thickness t of the bimetal 32, the length l of the bimetal 32, the curvature coefficient K of the bimetal 32, the spring constant k of the elastic member 52 of the second biasing means 50, an amount of deflection xb of the bimetal 32 at which all of the bimetals 32 come into contact with the holding frame 20, and a maximum temperature change $\Delta T_{max}$ of the ambient temperature. $F_{zmin}$ is, for example, represented by Formula (2a) below.

[Mathematical Formula 4]

$$F_{zmin} = \frac{Ebt^3}{4l^3}\left(x_b + \frac{kKl^2}{(Ebt^3 + 4l^3k)t}\Delta T_{max}\right) \qquad \text{Formula (2a)}$$

Figure 6:
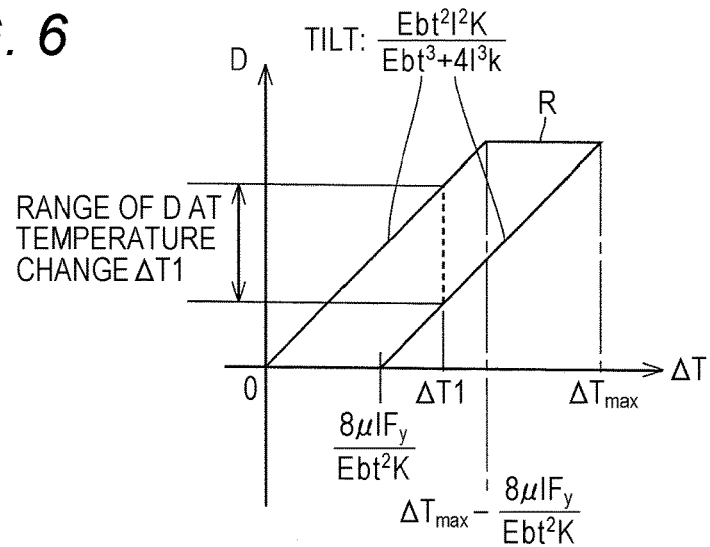
FIG. 6 is a graph showing a relationship between an amount of temperature change $\Delta T$ from a reference temperature and a movement distance D along a direction parallel to the direction of the optical axis from a reference position of the holding frame at the reference temperature to a position of the holding frame after a temperature change.

FIG. 6 is a graph showing a relationship between an amount of temperature change $\Delta T$ from a reference temperature and a movement distance D along a direction parallel to the direction of the optical axis from a reference position of the holding frame at the reference temperature to a position of the holding frame after a temperature change.

In this embodiment, the relationship between the amount of temperature change ΔT from the reference temperature and the movement distance D of the holding frame 20 is as shown in FIG. 5, where k is the spring constant of the elastic member, ΔT is the amount of temperature change from the reference temperature, D is the movement distance along the direction parallel to the direction of the optical axis from the reference position of the holding frame at the reference temperature to the position of the holding frame after the temperature change, $D_{min}$ is a minimum value of the movement distance D, $D_{max}$ is a maximum value of the movement distance D, and $\Delta T_{max}$ is the maximum amount of temperature change.

Specifically, the relationship may fall within a range of a hysteresis loop that has a substantially parallelogram shape, as shown as a region R, in which lengths of the base and the top are 8 $\mu l F_y/Ebt^2K$, and slopes of the oblique sides are $Ebt^2l^2K/(Ebt^3+4l^3k)$. For example, when the amount of temperature change is ΔT1, the movement distance D may fall within a linear range as shown as a range depicted in a dashed line.

More specifically, when a temperature range of ΔT satisfies Formula (3) below, the movement distance D may fall within a range in which $D_{min}$ and $D_{max}$ satisfy Formula (4) below, when the temperature range of ΔT satisfies Formula (5) below, the movement distance D may fall within a range in which $D_{min}$ and $D_{max}$ satisfy Formula (6) below, and when the temperature range of ΔT satisfies Formula (7) below, the movement distance D may fall within a range in which $D_{min}$ and $D_{max}$ satisfy Formula (8) below. It should be noted that ΔT is the amount of temperature change from the reference temperature refers to an absolute value of the temperature change from the reference temperature.

[Mathematical Formula 5]

$$0 \leq \Delta T \leq \frac{8\mu l F_y}{Ebt^2K} \quad \text{Formula (3)}$$

[Mathematical Formula 6]

$$D_{min} = 0, \quad D_{max} = \frac{Ebt^2l^2K\Delta T}{Ebt^3+4l^3k} \quad \text{Formula (4)}$$

[Mathematical Formula 7]

$$\frac{8\mu l F_y}{Ebt^2K} < \Delta T \leq \left(\Delta T_{max} - \frac{8\mu l F_y}{Ebt^2K}\right) \quad \text{Formula (5)}$$

[Mathematical Formula 8]

$$D_{min} = \frac{Ebt^2l^2K\Delta T - 8l^3\mu F_y}{Ebt^3+4l^3k}, \quad D_{max} = \frac{Ebt^2l^2K\Delta T}{Ebt^3+4l^3k} \quad \text{Formula (6)}$$

[Mathematical Formula 9]

$$\left(\Delta T_{max} - \frac{8\mu l F_y}{Ebt^2K}\right) < \Delta T \leq \Delta T_{max} \quad \text{Formula (7)}$$

[Mathematical Formula 10]

$$D_{min} = \frac{Ebt^2l^2K\Delta T}{Ebt^3+4l^3k}, \quad D_{max} = \frac{Ebt^2l^2K}{Ebt^3+4l^3k}\left(\Delta T_{max} - \frac{8\mu l F_y}{Ebt^2K}\right) \quad \text{Formula (8)}$$

Thus, providing the movement guide portions 60 extending parallel to the optical axis C and pressing the movement guide portions 60 against the holding frame 20 in the radial direction of the stationary tube 10 by the deformation of the bimetals 32 due to a temperature change to move the holding frame 20 in contact with the movement guide portions 60 enable the lens unit 1 according to this embodiment to correct variations in focal length caused by a change in ambient temperature while suppressing tilt relative to the plane perpendicular to the optical axis.

Although this embodiment has been illustrated and described above as having the movement guide portions 60 provided separate from the holding frame 20, it is not limited thereto, and the holding frame 20 and the movement guide portions 60 may be integrally formed, such as by injection molding. In this case, there is no need to provide the recess 12 in the holding frame 20, and each movement guide portion 60 has a substantially half-cylindrical shape having a curved surface on an outer peripheral side.

Although in this embodiment illustrated and described above the holding frame 20 is movably supported by the stationary tube 10 in the direction of the optical axis C outside the stationary tube 10, it is not limited thereto, and the holding frame 20 may be movably supported by the stationary tube 10 in the direction of the optical axis C inside the stationary tube 10.

Although this embodiment has been illustrated and described above as being provided with the second biasing means 50, it is not limited thereto. It is only required that the orientation of the holding frame 20 is maintained such that the holding frame 20 does not move under its own weight, and the second biasing means 50 may not be provided. In the case where the second biasing means 50 is provided, the holding frame 20 can be pulled toward the stationary tube 10 even when the lens unit 1 is used in an orientation in which the lens unit 1 is facing the ground, so that stability in use is provided.

Second Embodiment

Figure 7:
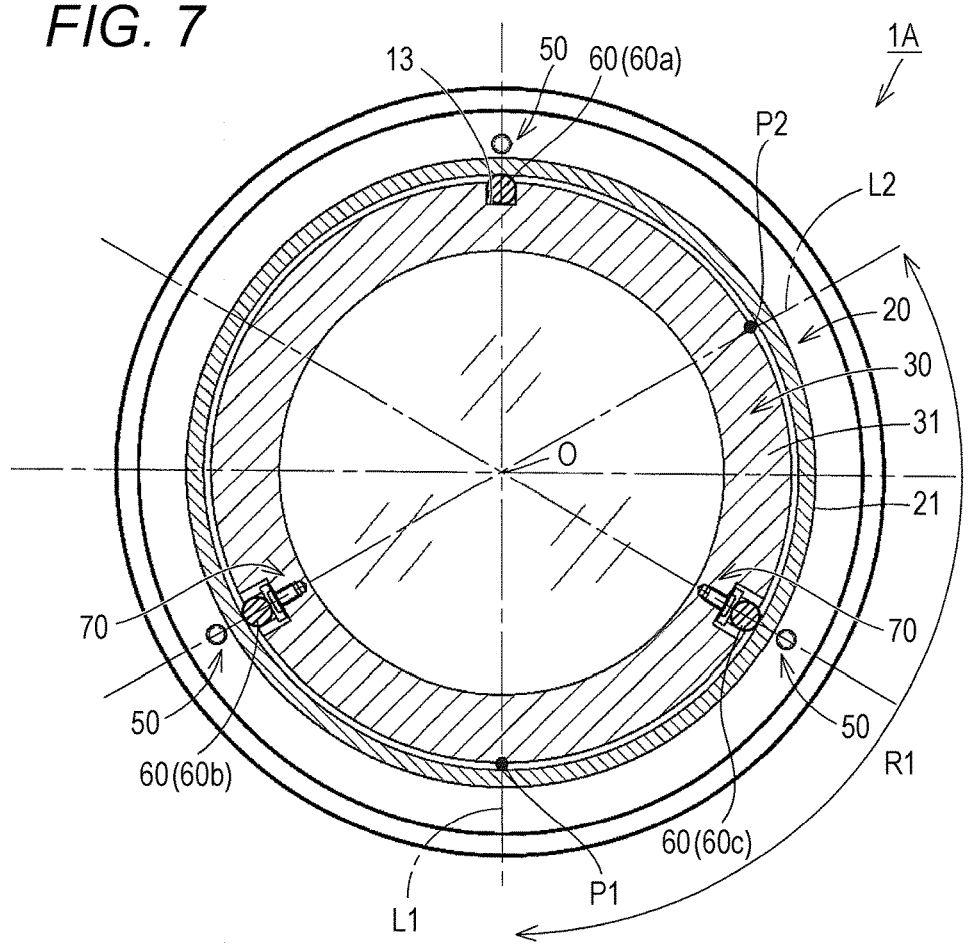
FIG. 7 is a top view of a lens unit according to a second embodiment.

FIG. 7 is a top view of a lens unit according to this embodiment. The lens unit according to this embodiment will be described with reference to FIG. 7.

As shown in FIG. 7, a lens unit 1A is different from the lens unit 1 according to the first embodiment in that positions of the movement guide portions 60 and the number of the first biasing means 70 are different to the lens unit 1 according to the first embodiment. Otherwise, they are substantially the same.

The movement guide portions 60 are arranged substantially equally spaced in the circumferential direction of the stationary tube 10. Even in this case, at least one of the movement guide portions 60c of the other movement guide portions 60 other than the first movement guide portion 60a and the second movement guide portion 60b is provided between the first intersection point P1 and the second intersection point P2 which are on the side in the circumferential direction of the stationary tube 10 where the first movement guide portion 60a and the second movement guide portion 60b are not located.

Two of the first biasing means 70 are provided. One of the two first biasing means 70 biases against the movement guide portion 60c in the radial direction of the stationary tube 10. The other of the two first biasing means 70 is provided so as to bias against at least one of the first movement guide portion 60a and the second movement guide portion 60b in the radial direction of the stationary tube 10. Specifically, the other of the two first biasing means 70 is provided so as to bias against the second movement guide portion 60b in the radial direction of the stationary tube 10.

In this embodiment, the biasing forces of the first biasing means 70 and the second biasing means 50 are also determined so that the radial force $F_y$ that acts on the stationary tube 10 and the force $F_z$ that acts on the bimetals 32 in the direction of the optical axis C satisfy predetermined conditions in accordance with the first embodiment.

Such a configuration allows this embodiment to also press the movement guide portions 60 against the holding frame 20 in the radial direction of the stationary tube 10 by the deformation of the bimetals 32 due to a temperature change to move the holding frame 20 in contact with the movement guide portions 60. Thus, substantially the same effects as those of the first embodiment are obtained.

Third Embodiment

Figure 8:
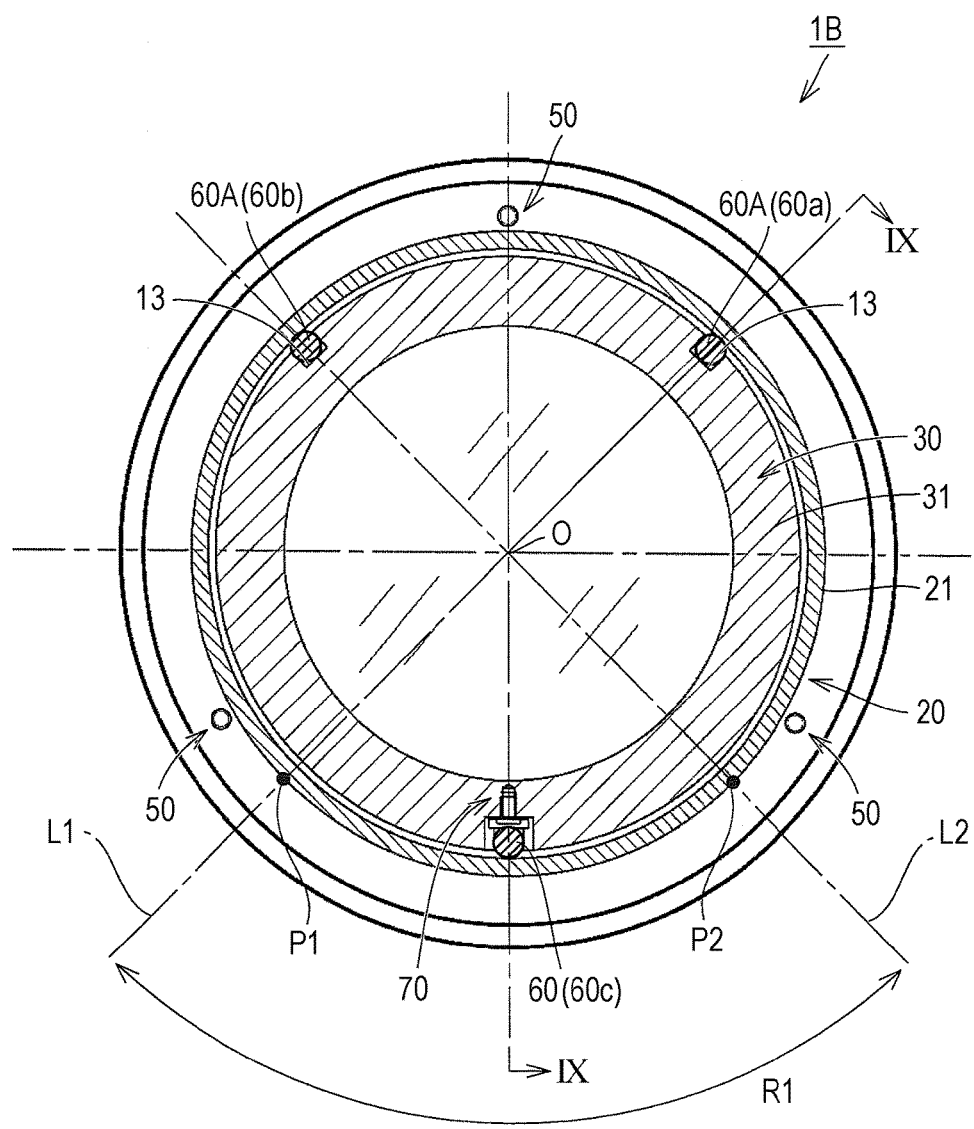
FIG. 8 is a top view of a lens unit according to a third embodiment.
Figure 9:
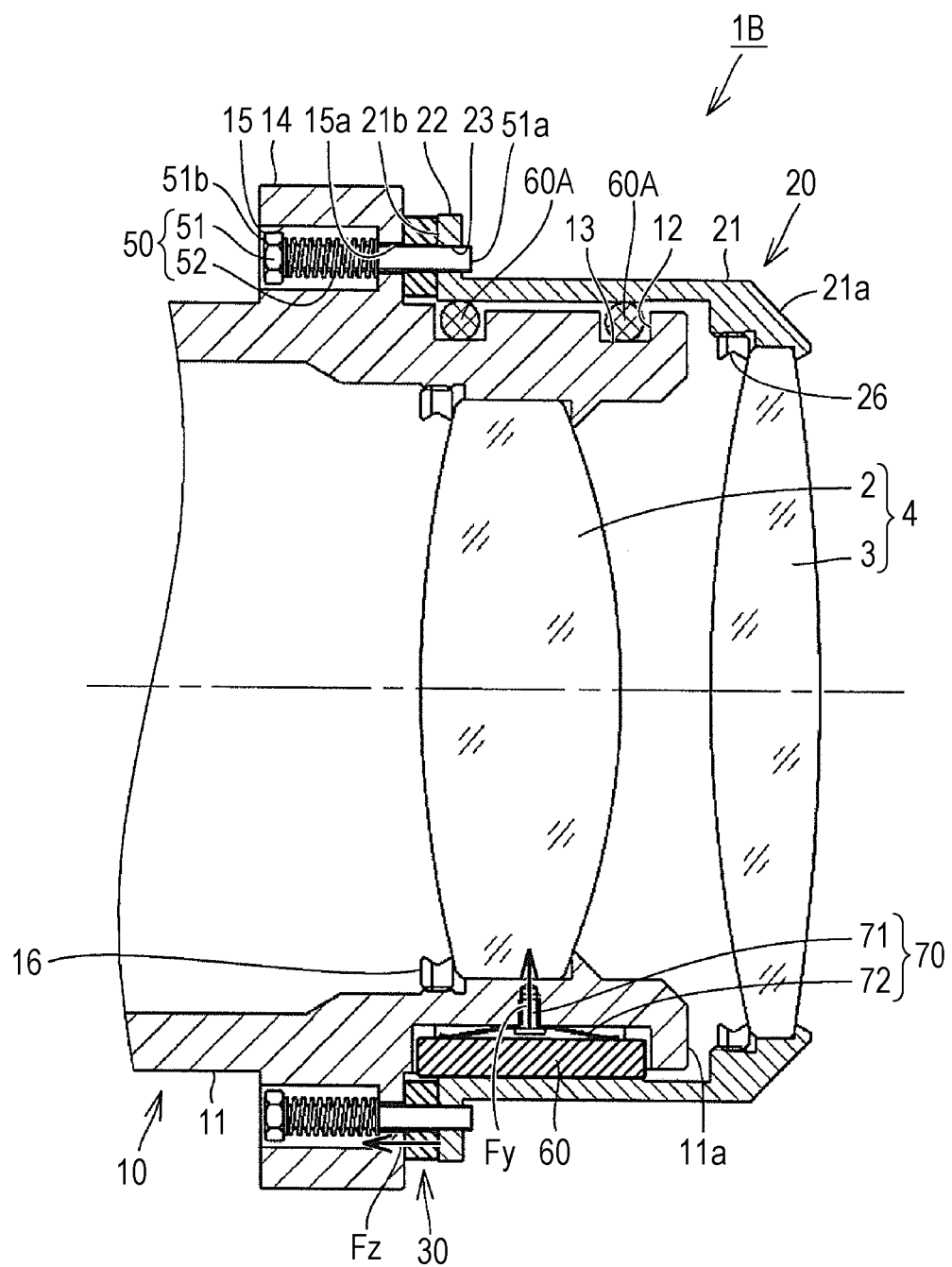
FIG. 9 is a schematic cross-sectional view taken along the line IX-IX of FIG. 8.

FIG. 8 is a top view of a lens unit according to this embodiment. FIG. 9 is a schematic cross-sectional view taken along the line IX-IX of FIG. 8. A lens unit 1B according to this embodiment will be described with reference to FIGS. 8 and 9.

As shown in FIGS. 8 and 9, the lens unit 1B according to this embodiment is different from the lens unit 1 according to the first embodiment in that two movement guide portions 60A having a different configuration are used in place of two of the movement guide portions 60. Otherwise, they are substantially the same.

Each movement guide portion 60A is configured by two spheres being aligned along the direction of the optical axis C. Each of the two spheres is in point contact with the inner peripheral surface of the holding frame 20. When the holding frame 20 moves due to the deformation of the bimetals 32 caused by a temperature change, the spheres rotate in the direction of the optical axis C while in contact with the holding frame 20, so that frictional force between the holding frame 20 and the movement guide portion 60A can be reduced compared to the case where the movement guide portions 60 are in line contact with the holding frame 20. It should be noted that the number of the spheres is not limited to two and may be one or three or more.

In this embodiment, the biasing forces of the first biasing means 70 and the second biasing means 50 are also determined so that the radial force $F_y$ that acts on the stationary tube 10 and the force $F_z$ that acts on the bimetals 32 in the direction of the optical axis C satisfy the predetermined conditions in accordance with the first embodiment.

Such a configuration allows this embodiment to also press the movement guide portions 60 against the holding frame 20 in the radial direction of the stationary tube 10 by the deformation of the bimetals 32 due to a temperature change to move the holding frame 20 in contact with the movement guide portions 60. Thus, substantially the same effects as those of the first embodiment are obtained.

Fourth Embodiment

Figure 10:
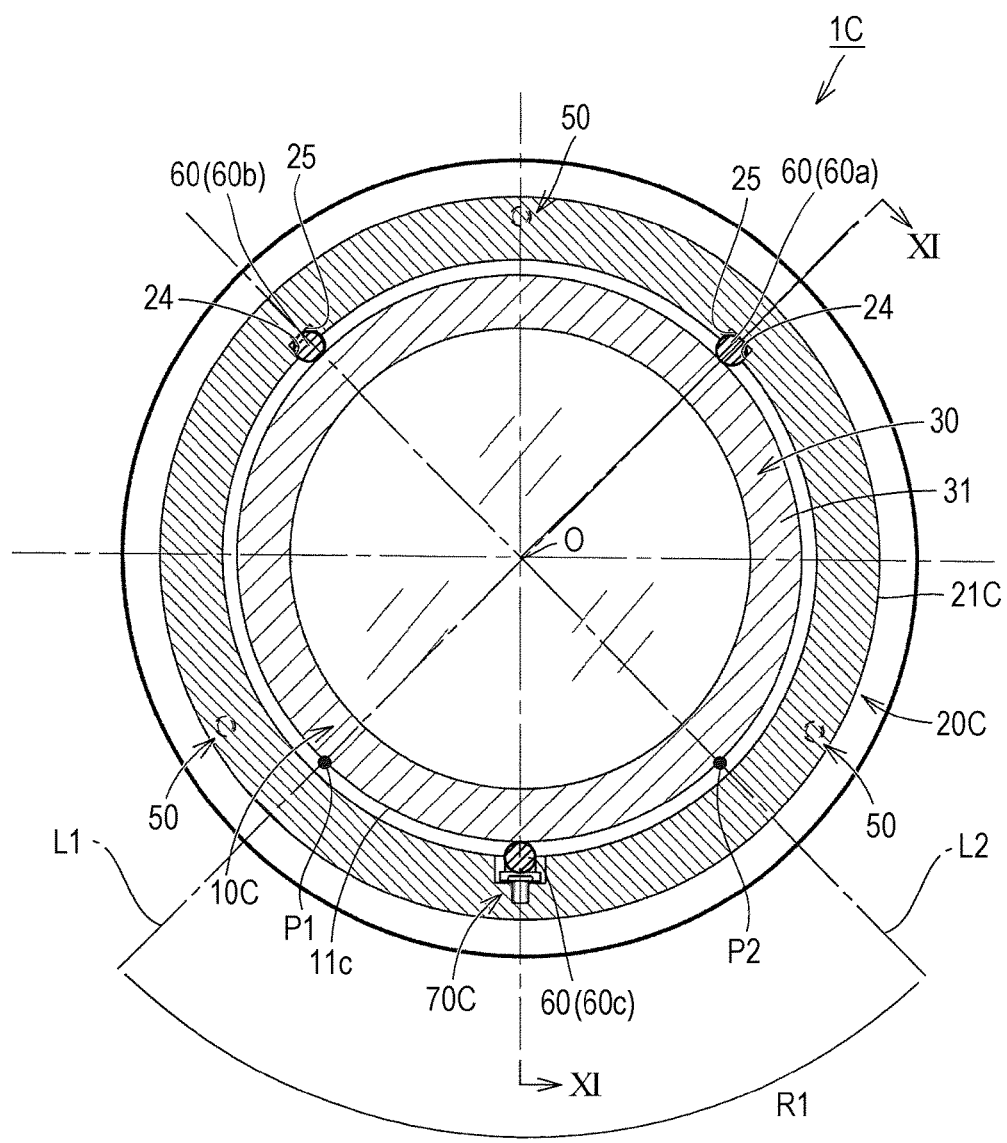
FIG. 10 is a top view of a lens unit according to a fourth embodiment.
Figure 11:
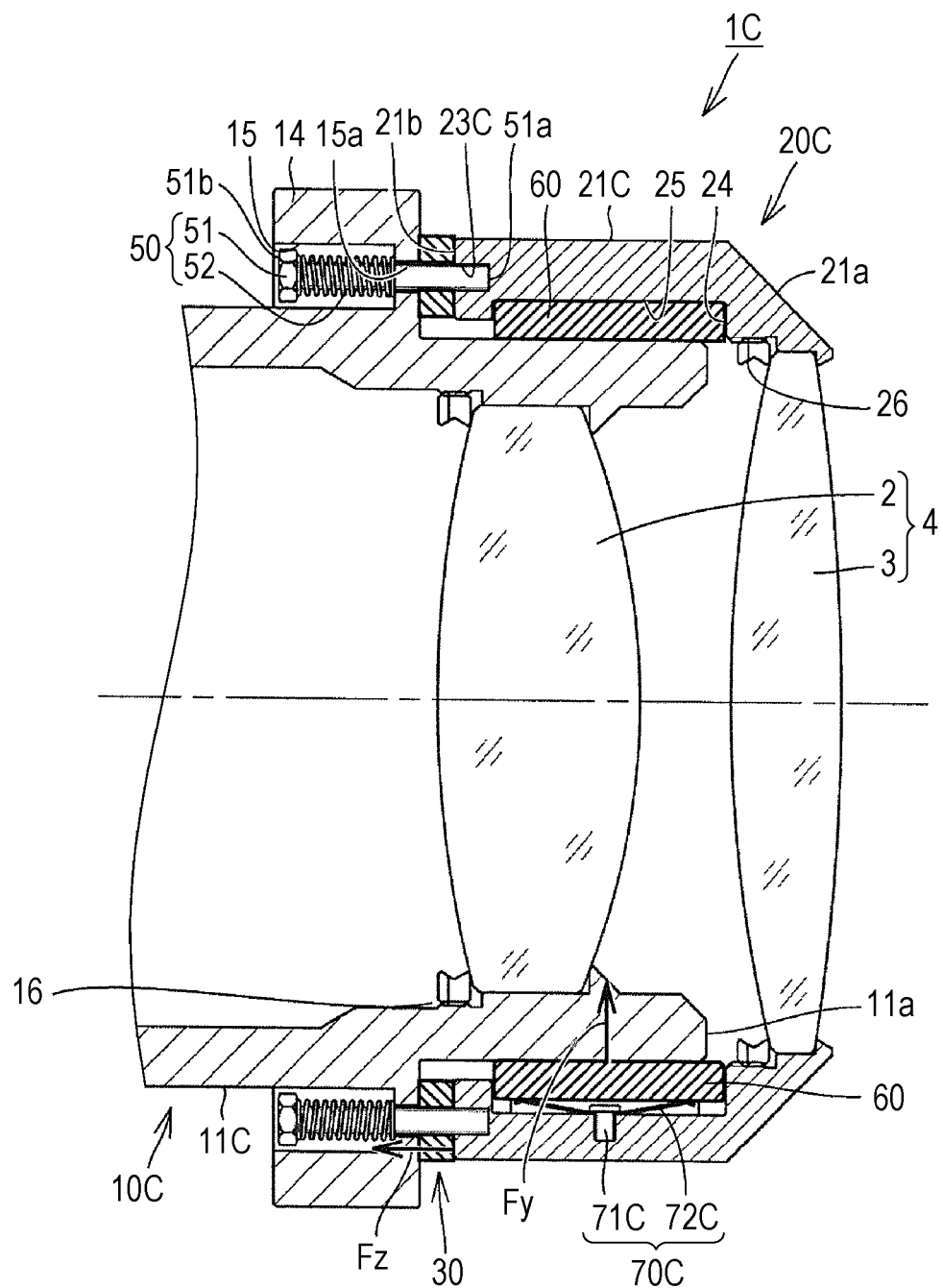
FIG. 11 is a schematic cross-sectional view taken along the line XI-XI of FIG. 10.

FIG. 10 is a top view of a lens unit according to this embodiment. FIG. 11 is a schematic cross-sectional view taken along the line XI-XI of FIG. 10. A lens unit 1C according to this embodiment will be described with reference to FIGS. 10 and 11.

As shown in FIGS. 10 and 11, the lens unit 1C according to this embodiment is different from the lens unit 1 according to the first embodiment in that the holding frame 20 is configured to be thick and in that the movement guide portions 60 are provided in recesses 24 which are provided on an inner peripheral surface of the tubular portion 21 of the holding frame 20, and in the configuration of a first biasing means 70C. Otherwise, they are substantially the same.

The recesses 24 are provided on the inner peripheral surface of the tubular portion 21. The recesses 24 are formed by the inner peripheral surface of the tubular portion 21 being recessed radially outwardly. The recesses 24 are provided between the distal end 21a and a rear end 21b of the tubular portion 21. A bottom 25 of each recess 24 is provided so as to be a plane that is parallel to the optical axis C. The bottom 25 of the recess 24 corresponds to the movement reference surface.

The first biasing means 70C has an elastic member 72C that is fixed to the holding frame 20 by a fixing portion 71C. The elastic member 72C is provided between the stationary tube 10 and the holding frame 20 in the radial direction of the stationary tube 10. The elastic member 72C presses the movement guide portions 60 against the outer peripheral surface of the stationary tube 10.

In this embodiment, the biasing forces of the first biasing means 70C and the second biasing means 50 are also determined so that the radial force $F_y$ that acts on the stationary tube 10 and the force $F_z$ that acts on the bimetals 32 in the direction of the optical axis C satisfy the predetermined conditions in accordance with the first embodiment.

Such a configuration allows this embodiment to also press the movement guide portions 60 against the holding frame 20 in the radial direction of the stationary tube 10 by the deformation of the bimetals 32 due to a temperature change to move the holding frame 20 in contact with the movement guide portions 60. Thus, substantially the same effects as those of the first embodiment are obtained.

Although in Embodiments 1 to 4 illustrated and described above, the heat deformed members, which are provided between the stationary tube and the holding frame in the radial direction of the stationary tube and which limit rotation of the holding frame in the direction intersecting with the plane orthogonal to the optical axis and guide the movement of the holding frame in the direction of the optical axis by being in contact with at least one of the stationary tube and the holding frame, are bimetals, it is not limited thereto, and the heat deformed members may be members made of a material that has a coefficient of linear expansion of $8 \times 10^{-5}$ (1/K) or greater and $15 \times 10^{-5}$ (1/K) or smaller. As the material with the coefficient of linear expansion in this range suitable for the heat deformed members, materials such as polyacetal resin (POM) and polybutylene terephthalate (PBT) which have relatively high thermal expansion properties may be suitably used.

The lens unit according to one or more embodiments of the present invention described above is a lens unit that includes an optical system having a plurality of lenses. The lens unit includes a correction lens that forms a part of the plurality of lenses, has an optical axis, and is configured to correct movement of a focus position of the optical system caused by a temperature change by being moved in a direction of the optical axis, a holding frame that holds the correction lens, a stationary tube that movably supports the holding frame along the direction of the optical axis, a movement guide portion that is provided between the stationary tube and the holding frame in a radial direction of the stationary tube and configured to limit rotation of the holding frame in a direction intersecting with a plane orthogonal to the optical axis and to guide movement of the holding frame in the direction of the optical axis by being in contact with at least one of the stationary tube and the holding frame, a plurality of bimetals that are provided between the stationary tube and the holding frame in the direction of the optical axis, arranged in a circumferential direction of the stationary tube, and configured to change a distance between the holding frame and the stationary tube along the direction of the optical axis by deformation associated with the temperature change, and a first biasing means that is configured to relatively bias the holding frame against the stationary tube via the movement guide portion in the radial direction of the stationary tube.

The lens unit according to one or more embodiments of the present invention may further include a second biasing means that biases the holding frame against the bimetals in the direction of the optical axis.

In the lens unit according to one or more embodiments of the present invention, each of the bimetals is plate-shaped having a lateral direction and a longitudinal direction and having a thickness in a direction sandwiched between the stationary tube and the holding frame, and biasing forces of the first biasing means and the second biasing means are determined so as to satisfy Formula (1) below, where Fy is a force in the radial direction that acts on the stationary tube, f(d) is a function of a tilt Δd relative to a plane perpendicular to the optical axis permitted to the holding frame, mg is a weight of a moving portion that includes the holding frame and the correction lens, ΔTa is the temperature change required for the holding frame to start moving, E is an elastic modulus of the bimetal, b is a width of the bimetal in the lateral direction, t is the thickness of the bimetal, l is a length of the bimetal in the longitudinal direction, K is a curvature coefficient of the bimetal, and μ is a friction coefficient during movement of the holding frame in the direction of the optical axis.

[Mathematical Formula 11]

$$mgf(d) < F_y < \frac{Ebt^2 K}{8\mu l} \Delta T_a \qquad \text{Formula (1)}$$

In the lens unit according to one or more embodiments of the present invention, the second biasing means may include an elastic member that expands and contracts along the direction of the optical axis. In this case, the biasing forces of the first biasing means and the second biasing means may be determined so as to satisfy Formula (2) below, where Fz is a force that acts on the bimetals in the direction of the optical axis, Fzmin is a minimum force that acts on the bimetals in the direction of the optical axis and is required for all of the plurality of the bimetals to come into contact with the holding frame within an operating temperature range, and σa is an allowable stress of the bimetal.

[Mathematical Formula 12]

$$F_{zmin} < F_z < \frac{bt^2 \sigma_a}{6l} \qquad \text{Formula (2)}$$

In the lens unit according to one or more embodiments of the present invention, when a temperature range of ΔT satisfies Formula (3) below, a movement distance D may fall within a range in which Dmin and Dmax satisfy Formula (4) below, where k is a spring constant of the elastic member, ΔT is an amount of temperature change from a reference temperature, D is the movement distance along the direction parallel to the direction of the optical axis from a reference position of the holding frame at the reference temperature to a position of the holding frame after the temperature change, Dmin is a minimum value of the movement distance D, Dmax is maximum value of the movement distance D, and ΔTmax is a maximum of the amount of temperature change. In addition, when the temperature range of ΔT satisfies Formula (5) below, the movement distance D may fall within a range in which the Dmin and the Dmax satisfy Formula (6) below. Further, when the temperature range of ΔT satisfies Formula (7) below, the movement distance D may fall within a range in which the Dmin and the Dmax satisfy Formula (8) below.

[Mathematical Formula 13]

$$0 \leq \Delta T \leq \frac{8\mu l F_y}{Ebt^2 K} \qquad \text{Formula (3)}$$

[Mathematical Formula 14]

$$D_{min} = 0, \quad D_{max} = \frac{Ebt^2 l^2 K \Delta T}{Ebt^3 + 4l^3 k} \qquad \text{Formula (4)}$$

[Mathematical Formula 15]

$$\frac{8\mu l F_y}{Ebt^2 K} < \Delta T \leq \left(\Delta T_{max} - \frac{8\mu l F_y}{Ebt^2 K}\right) \qquad \text{Formula (5)}$$

[Mathematical Formula 16]

$$D_{min} = \frac{Ebt^2 l^2 K \Delta T - 8l^3 \mu F_y}{Ebt^3 + 4l^3 k}, \quad D_{max} = \frac{Ebt^2 l^2 K \Delta T}{Ebt^3 + 4l^3 k} \qquad \text{Formula (6)}$$

[Mathematical Formula 17]

$$\left(\Delta T_{max} - \frac{8\mu l F_y}{Ebt^2 K}\right) < \Delta T \leq \Delta T_{max} \qquad \text{Formula (7)}$$

[Mathematical Formula 18]

$$D_{min} = \frac{Ebt^2 l^2 K \Delta T}{Ebt^3 + 4l^3 k}, \quad D_{max} = \frac{Ebt^2 l^2 K}{Ebt^3 + 4l^3 k}\left(\Delta T_{max} - \frac{8\mu l F_y}{Ebt^2 K}\right) \qquad \text{Formula (8)}$$

In the lens unit according to one or more embodiments of the present invention, a plurality of the second biasing means is provided, in which case, a position of the holding frame relative to the stationary tube in the direction of the optical axis is adjusted by the biasing force generated by each of the second biasing means.

In the lens unit according to one or more embodiments of the present invention, a plurality of the movement guide portions is provided so as to be arranged spaced from each other in a circumferential direction when viewed from the direction of the optical axis. In this case, at least one of the movement guide portions of the other movement guide portions other than a first movement guide portion and a second movement guide portion is provided between a first intersection point and a second intersection point which are on a side in the circumferential direction where the first movement guide portion and the second movement guide portion are not located, where the first movement guide portion and the second movement guide portion are two of the movement guide portions adjacent to each other in the circumferential direction of the plurality of the movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube. Further, the first biasing means is provided so as to bias against at least one of the movement guide portions of the other movement guide portions in the radial direction of the stationary tube.

In the lens unit according to one or more embodiments of the present invention, the first biasing means may be further provided so as to bias against at least one of the first movement guide portion and the second movement guide portion in the radial direction of the stationary tube.

In the lens unit according to one or more embodiments of the present invention, the movement guide portions may be provided separate from the stationary tube.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 1A, 1B, 1C Lens unit
2 Lens
3 Correction lens
4 Optical system
10 Stationary tube
11 Tubular portion
11a Distal end
12 Recess
13 Bottom
14 Flange portion
15 Receptacle
15a Hole
16 Lens holding portion
20 Holding frame
21 Tubular portion
21a Distal end
21b Rear end
22 Collar portion
23 Through hole
24 Recess
25 Bottom
26 Lens holding portion
30 Focal length correction means
31 Base plate
32 Bimetal
50 Second biasing means
51 Screw
51a Distal end
52 Elastic member
60, 60A, 60c Movement guide portion
60a First movement guide portion
60b Second movement guide portion
70, 70C First biasing means
71, 71C Fixing portion
72, 72C Elastic member

The invention claimed is:

1. A lens unit including an optical system having a plurality of lenses, the lens unit comprising:
   a correction lens forming a part of the plurality of lenses and having an optical axis, and configured to correct movement of a focus position of the optical system caused by a temperature change by being moved in a direction of the optical axis;
   a holding frame holding the correction lens;
   a stationary tube movably supporting the holding frame along the direction of the optical axis;
   at least one movement guide portion provided between the stationary tube and the holding frame in a radial direction of the stationary tube, and configured to limit rotation of the holding frame in a direction intersecting with a plane orthogonal to the optical axis and to guide movement of the holding frame in the direction of the optical axis by being in contact with at least one of the stationary tube and the holding frame;
   a plurality of heat deformed members provided between the stationary tube and the holding frame in the direction of the optical axis, arranged in a circumferential direction of the stationary tube, and configured to change a distance between the holding frame and the stationary tube along the direction of the optical axis by deformation associated with the temperature change; and
   a first biasing means configured to relatively bias the holding frame against the stationary tube via the at least one movement guide portion in the radial direction of the stationary tube.

2. The lens unit according to claim 1, further comprising at least one second biasing means configured to bias the holding frame against the stationary tube via the plurality of heat deformed members in the direction of the optical axis.

3. The lens unit according to claim 2, wherein
   the heat deformed member is plate-shaped having a lateral direction and a longitudinal direction and having a thickness in a direction sandwiched between the stationary tube and the holding frame, and
   biasing forces of the first biasing means and the at least one second biasing means are determined so as to satisfy Formula (1):

[Mathematical Formula 1]

$$mgf(d) < F_y < \frac{Ebt^2 K}{8\mu l}\Delta T_a \qquad \text{Formula (1)}$$

where $F_y$ is a force that acts on the stationary tube in the radial direction,
f(d) is a function of a tilt d relative to a plane perpendicular to the optical axis permitted to the holding frame,
mg is a weight of a moving portion including the holding frame and the correction lens,
$\Delta T_a$ is the temperature change required for the holding frame to start moving,
E is an elastic modulus of the heat deformed member,
b is a width of the heat deformed member in the lateral direction,
t is the thickness of the heat deformed member,
l is a length of the heat deformed member in the longitudinal direction, K is a curvature coefficient of the heat deformed member, and μ is a friction coefficient during movement of the holding frame in the direction of the optical axis.

4. The lens unit according to claim 3, wherein the at least one second biasing means includes an elastic member that expands and contracts along the direction of the optical axis, and the biasing forces of the first biasing means and the at least one second biasing means are determined so as to satisfy Formula (2):

[Mathematical Formula 2]

$$F_{zmin} < F_z < \frac{bt^2 \sigma_a}{6l} \qquad \text{Formula (2)}$$

where $F_z$ is a force that acts on the plurality of heat deformed members in the direction of the optical axis, $F_{zmin}$ is a minimum force that acts on the plurality of heat deformed members in the direction of the optical axis and is required for all of the plurality of heat deformed members to come into contact with the holding frame within an operating temperature range, and $\sigma_a$ is an allowable stress of the heat deformed member.

5. The lens unit according to claim 4, wherein when a temperature range of ΔT satisfies Formula (3):

[Mathematical Formula 3]

$$0 \leq \Delta T \leq \frac{8 \mu l F_y}{Ebt^2 K} \qquad \text{Formula (3)}$$

a movement distance D falls within a range in which $D_{min}$ and $D_{max}$ satisfy Formula (4):

[Mathematical Formula 4]

$$D_{min} = 0, \quad D_{max} = \frac{Ebt^2 l^2 K \Delta T}{Ebt^3 + 4l^3 k} \qquad \text{Formula (4)}$$

when the temperature range of ΔT satisfies Formula (5):

[Mathematical Formula 5]

$$\frac{8 \mu l F_y}{Ebt^2 K} < \Delta T \leq \left( \Delta T_{max} - \frac{8 \mu l F_y}{Ebt^2 K} \right) \qquad \text{Formula (5)}$$

the movement distance D falls within a range in which the $D_{min}$ and the $D_{max}$ satisfy Formula (6):

[Mathematical Formula 6]

$$D_{min} = \frac{Ebt^2 l^2 K \Delta T - 8 l^3 \mu F_y}{Ebt^3 + 4 l^3 k}, \quad D_{max} = \frac{Ebt^2 l^2 K \Delta T}{Ebt^3 + 4 l^3 k} \qquad \text{Formula (6)}$$

and when the temperature range of ΔT satisfies Formula (7):

[Mathematical Formula 7]

$$\left( \Delta T_{max} - \frac{8 \mu l F_y}{Ebt^2 K} \right) < \Delta T \leq \Delta T_{max} \qquad \text{Formula (7)}$$

the movement distance D falls within a range in which the $D_{min}$ and the $D_{max}$ satisfy Formula (8):

[Mathematical Formula 8]

$$D_{min} = \frac{Ebt^2 l^2 K \Delta T}{Ebt^3 + 4l^3 k}, \quad D_{max} = \frac{Ebt^2 l^2 K}{Ebt^3 + 4l^3 k} \left( \Delta T_{max} - \frac{8 \mu l F_y}{Ebt^2 K} \right) \qquad \text{Formula (8)}$$

where k is a spring constant of the elastic member, ΔT is an amount of temperature change from a reference temperature, D is the movement distance along the direction parallel to the direction of the optical axis from a reference position of the holding frame at the reference temperature to a position of the holding frame after the temperature change, $D_{min}$ is a minimum value of the movement distance D, $D_{max}$ is a maximum value of the movement distance D, and $\Delta T_{max}$ is a maximum of the amount of temperature change.

6. The lens unit according to claim 2, wherein the at least one second biasing means comprises a plurality of second biasing means, and a position of the holding frame relative to the stationary tube in the direction of the optical axis is adjusted by the biasing force generated by each of the plurality of second biasing means.

7. The lens unit according to claim 1, wherein the at least one movement guide portion comprises a plurality of movement guide portions so as to be arranged spaced from each other in a circumferential direction when viewed from the direction of the optical axis, at least one of the movement guide portions of the other of the plurality of movement guide portions other than a first movement guide portion and a second movement guide portion is provided between a first intersection point and a second intersection point, the first intersection point and the second intersection point being on a side in the circumferential direction where the first movement guide portion and the second movement guide portion are not located, where the first movement guide portion and the second movement guide portion are two of the movement guide portions adjacent to each other in the circumferential direction of the plurality of movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube, and the first biasing means is provided so as to bias against at least one of the movement guide portions of the other of the plurality of movement guide portions in the radial direction of the stationary tube.

8. The lens unit according to claim 7, wherein
the first biasing means is further provided so as to bias against at least one of the first movement guide portion and the second movement guide portion in the radial direction of the stationary tube.

9. The lens unit according to claim 1, wherein
the plurality of movement guide portions is provided separate from the stationary tube.

10. The lens unit according to claim 2, wherein:
the at least one movement guide portion comprises a plurality of movement guide portions so as to be arranged spaced from each other in a circumferential direction when viewed from the direction of the optical axis, at least one of the movement guide portions of the other of the plurality of movement guide portions other than a first movement guide portion and a second movement guide portion is provided between a first intersection point and a second intersection point, the first intersection point and the second intersection point being on a side in the circumferential direction where the first movement guide portion and the second movement guide portion are not located, where the first movement guide portion and the second movement guide portion are two of the movement guide portions adjacent to each other in the circumferential direction of the plurality of movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube, and the first biasing means is provided so as to bias against at least one of the movement guide portions of the other of the plurality of movement guide portions in the radial direction of the stationary tube.

11. The lens unit according to claim 2, wherein
the plurality of movement guide portions is provided separate from the stationary tube.

12. The lens unit according to claim 3, wherein
the at least one second biasing means comprises a plurality of second biasing means, and a position of the holding frame relative to the stationary tube in the direction of the optical axis is adjusted by the biasing force generated by each of the plurality of second biasing means.

13. The lens unit according to claim 3, wherein:
the at least one movement guide portion comprises a plurality of movement guide portions so as to be arranged spaced from each other in a circumferential direction when viewed from the direction of the optical axis, at least one of the movement guide portions of the other of the plurality of movement guide portions other than a first movement guide portion and a second movement guide portion is provided between a first intersection point and a second intersection point, the first intersection point and the second intersection point being on a side in the circumferential direction where the first movement guide portion and the second movement guide portion are not located, where the first movement guide portion and the second movement guide portion are two of the movement guide portions adjacent to each other in the circumferential direction of the plurality of movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube, and the first biasing means is provided so as to bias against at least one of the movement guide portions of the other of the plurality of movement guide portions in the radial direction of the stationary tube.

14. The lens unit according to claim 3, wherein
the plurality of movement guide portions is provided separate from the stationary tube.

15. The lens unit according to claim 4, wherein
the at least one second biasing means comprises a plurality of second biasing means, and a position of the holding frame relative to the stationary tube in the direction of the optical axis is adjusted by the biasing force generated by each of the plurality of second biasing means.

16. The lens unit according to claim 4, wherein:
the at least one movement guide portion comprises a plurality of movement guide portions so as to be arranged spaced from each other in a circumferential direction when viewed from the direction of the optical axis, at least one of the movement guide portions of the other of the plurality of movement guide portions other than a first movement guide portion and a second movement guide portion is provided between a first intersection point and a second intersection point, the first intersection point and the second intersection point being on a side in the circumferential direction where the first movement guide portion and the second movement guide portion are not located, where the first movement guide portion and the second movement guide portion are two of the movement guide portions adjacent to each other in the circumferential direction of the plurality of movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube, and the first biasing means is provided so as to bias against at least one of the movement guide portions of the other of the plurality of movement guide portions in the radial direction of the stationary tube.

17. The lens unit according to claim 4, wherein the plurality of movement guide portions is provided separate from the stationary tube.

18. The lens unit according to claim 5, wherein the at least one second biasing means comprises a plurality of second biasing means, and a position of the holding frame relative to the stationary tube in the direction of the optical axis is adjusted by the biasing force generated by each of the plurality of second biasing means.

19. The lens unit according to claim 5, wherein:
the at least one movement guide portion comprises a plurality of movement guide portions so as to be arranged spaced from each other in a circumferential direction when viewed from the direction of the optical axis, at least one of the movement guide portions of the other of the plurality of movement guide portions other than a first movement guide portion and a second movement guide portion is provided between a first intersection point and a second intersection point, the first intersection point and the second intersection point being on a side in the circumferential direction where the first movement guide portion and the second movement guide portion are not located, where the first movement guide portion and the second movement guide portion are two of the movement guide portions adjacent to each other in the circumferential direction of the plurality of movement guide portions, a first imaginary line is a line connecting the first movement guide portion to a center of the stationary tube and a second imaginary line is a line connecting the second movement guide portion to the center of the stationary tube when viewed from the direction of the optical axis, the first intersection point is located opposite the first movement guide portion when viewed from the center and is an intersection point between the first imaginary line and an outer peripheral surface of the stationary tube, and the second intersection point is located opposite the second movement guide portion when viewed from the center and is an intersection point between the second imaginary line and the outer peripheral surface of the stationary tube, and the first biasing means is provided so as to bias against at least one of the movement guide portions of the other of the plurality of movement guide portions in the radial direction of the stationary tube.

20. The lens unit according to claim 5, wherein the plurality of movement guide portions is provided separate from the stationary tube.

* * * * *